May 10, 1938.  C. M. EASON  2,116,740
CLUTCH
Filed Feb. 1, 1937  2 Sheets-Sheet 2
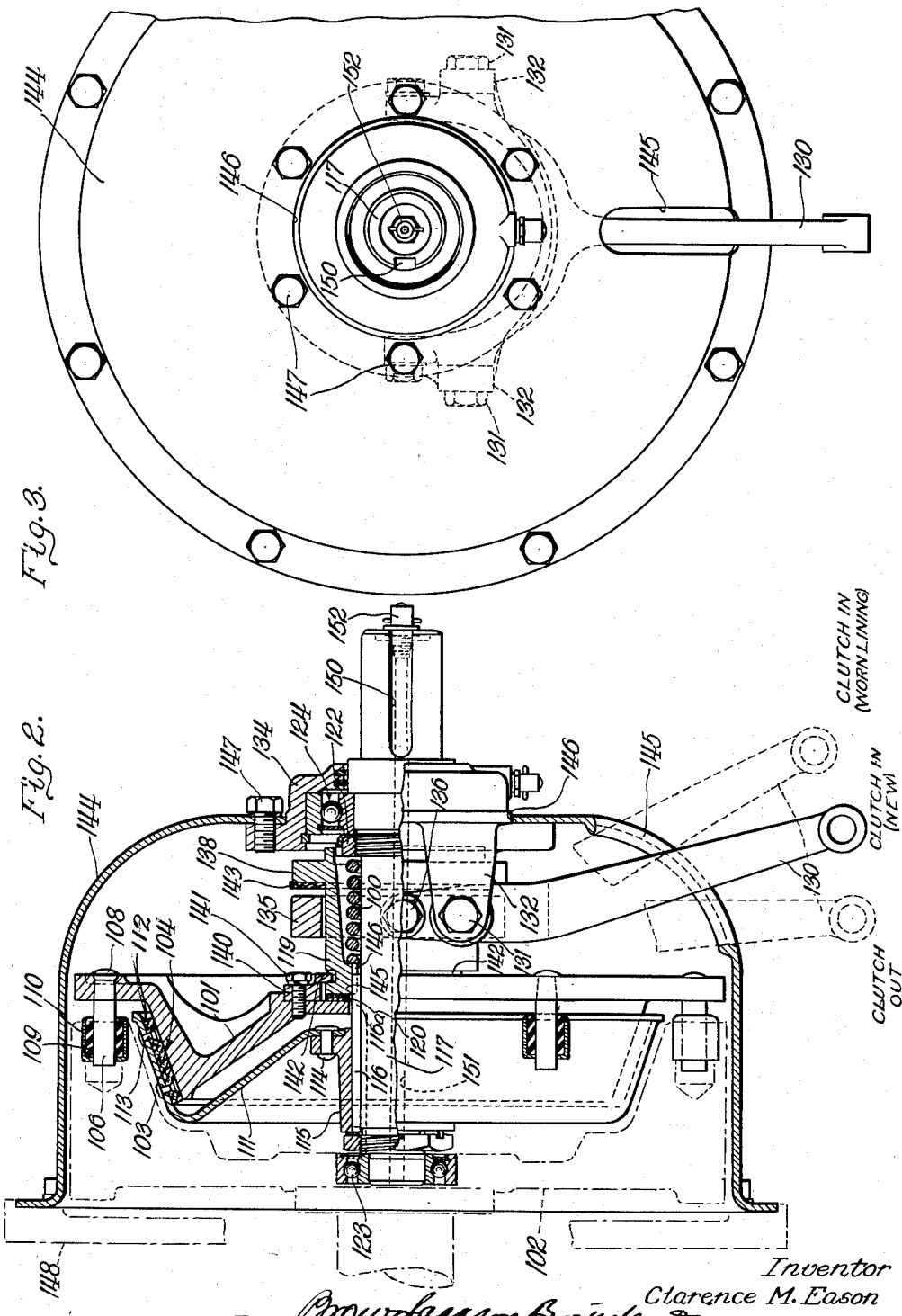
Inventor
Clarence M. Eason
By [signature] Attys Patented May 10, 1938

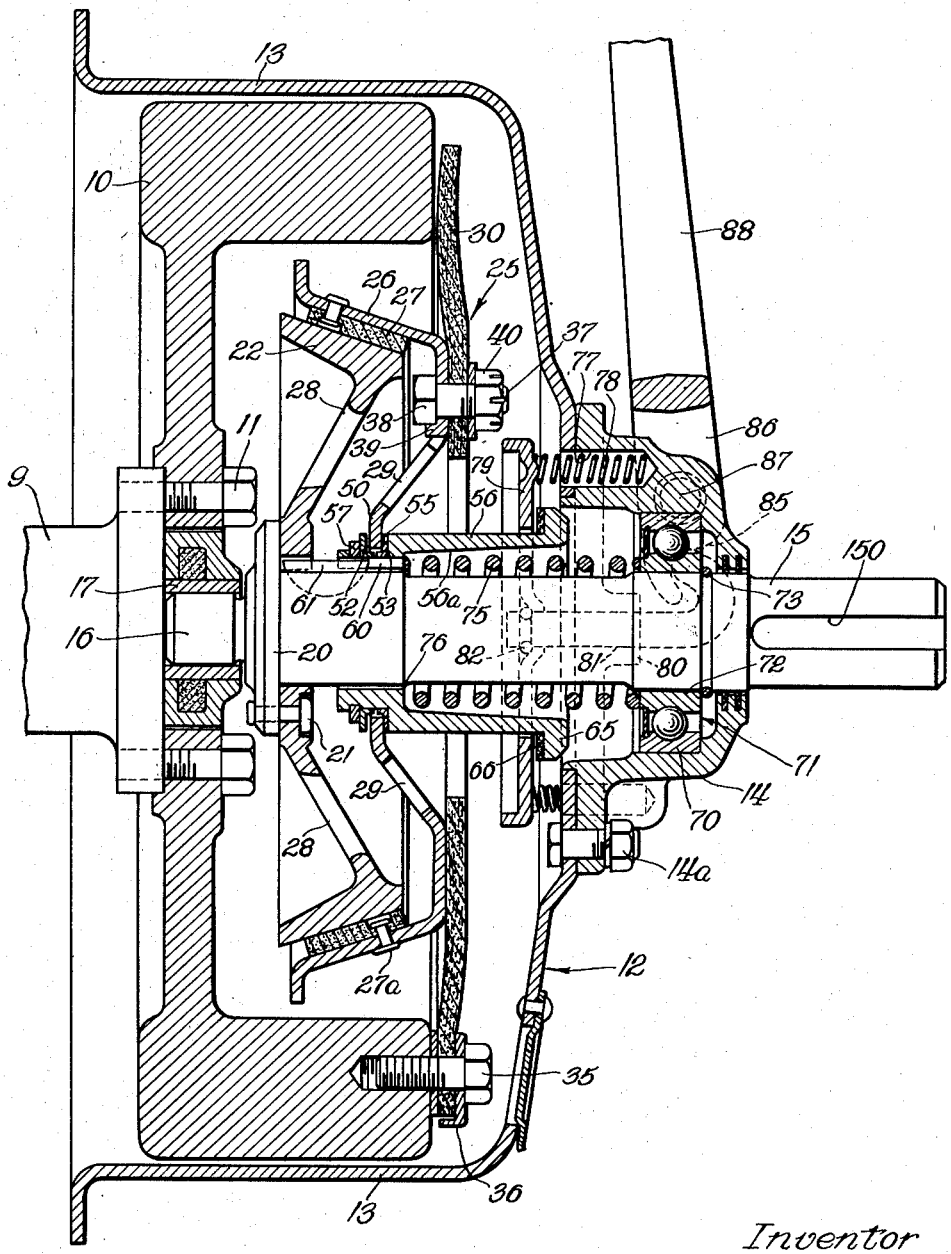

2,116,740

UNITED STATES PATENT OFFICE 2,116,740

CLUTCH

Clarence M. Eason, Waukesha, Wis., assignor to Industrial Clutch Company, a corporation of Wisconsin Application February 1, 1937, Serial No. 123,425

13 Claims. (Cl. 192—66)

This application is a continuation in part of my copending application Serial No. 97,336, filed August 22, 1936, and my copending application Serial No. 117,809, filed December 28, 1936.

The present invention relates generally to clutch mechanisms, and more particularly to clutches of the spring loaded type. While I have disclosed two embodiments of the invention which I shall describe hereinafter and in which both embodiments disclose clutches of the cone type, it will be understood that the principles of the present invention are not necessarily limited to clutches of this nature, but are equally applicable to disc clutches and other clutches of any type in which engagement and disengagement are effected by axial movement of one or more parts.

The principal object of the present invention is the provision of a new and improved shifting mechanism, particularly adapted for spring loaded clutches, and more specifically it is an object of the present invention to provide a shiftable sleeve which contains the biasing or loading spring and which is loosely connected with the associated clutch element and keyed or otherwise connected to rotate with one of the driving and driven parts but capable of the necessary axial shifting movement to engage and disengage the clutch.

These and other objects and advantages of the present invention will be apparent to those skilled in the art after a consideration of the following detailed description, taken in conjunction with the accompanying drawings.

In the drawings:

Figure 1 is a vertical longitudinal section taken through a clutch mechanism embodying the principles of the present invention;

Figure 2 is a longitudinal section, similar to Figure 1, taken through another form of device embodying the present invention; and Figure 3 is a fragmentary end view of the clutch shown in Figure 2.

Referring now to Figure 1, the crank shaft of the engine or other source of power is indicated by the reference numeral 9 and has a driving element in the form of a flywheel 10 bolted thereto, as at 11, and rotatable within a clutch housing 12 that includes a sheet metal portion 13 and a cast hub or nose section 14 bolted thereto, as at 14a. The driven element is indicated at 15 and comprises a driven shaft having an inner end 16 supported for rotation in the outer end of the drive shaft 9, as by a bushing 17. A flange 20 is formed on the inner end of the driven shaft 15 and receives bolts or rivets 21 or other means by which a driven member 22 is secured for rotation with the driven shaft 15. The driven clutch member 22 is in the form of a conical part serving as the male member of the clutch. The driving member of the clutch is indicated at 25 and comprises a pressed metal member having a conical portion 26 to the inner surface of which a clutch lining 27 is riveted, as at 27a. The clutch part 26 serves as the female member of the clutch. To promote a circulation of air through the clutch, the driven member 22 is provided with openings 28 and the driving member 25 is provided with similar openings 29.

The driving clutch member 25 is connected to the driving element 10 by a flat disc or ring 30 formed of flexible fabric-like material, such as vulcanized rubber and fabric available in the open market. The disc 30 has sufficient strength to transmit all required torque from the driving element 10 to the driving clutch member 25, but is sufficiently flexible to permit the driving clutch member 25 to move in practically any direction with respect to the driving element 10, whereby the driving clutch member 25 moves bodily with the driven clutch member 22 and accommodates any misalignment between the driving and driven parts of the unit. The flexible disc or ring 30 is bolted at its outer peripheral portions to the rim of the flywheel 10 by cap screws 35 or the like, which are securely held in place by lock washers 36 of the spring type. The radially inner portions of the disc or ring 30 are securely fastened to the pressed metal driving clutch member 25 by any suitable means, such as the bolts 37, the heads 38 of which are arranged against a shoulder 39 formed by a small projection of the pressed metal clutch member that is bent upwardly into the position shown in Figure 1 and which serves to prevent the bolt 37 from turning when the nut 40 is threaded onto the bolt to securely fasten the flexible disc 30 to the driving clutch member 25. Preferably, the several bolts 35 and 37 are in staggered relation.

The radially inner portion 50 of the pressed metal driving clutch member 25 is received between a pair of thrust rings 52 and 53, which are seated against a shoulder 55 formed at the inner end of a shiftable sleeve 56 that is slidably mounted on the driven shaft 15. The thrust rings 52 and 53 are held in place by a spring ring 57 that is snapped into a groove cut in the innermost end of the sleeve 56, and as best shown in Figure 1 the rings are so spaced that the portion 50 is loosely received to accommodate a certain amount of relative movement between the clutch member 25 and the sleeve 56. Th latter is arranged to rotate with the driven shaft 15 at all times in any suitable manner, such as by having a slot 60 cut in the inner end of the sleeve 56 and engageable with a key 61 carried by the inner end of the driven shaft 15. The outer end of the sleeve 56 is formed with a flange 65 to which a thrust ring 66 is secured in the inner face thereof in any suitable manner.

The driving clutch member 25 is shifted into and out of engagement with the driven clutch member 22 by means that will now be described. The nose or extension 14 of the clutch housing 12 is formed to receive the outer race 70 of a bearing unit that is indicated in its entirety by the reference numeral 71 and which includes an inner race 72 mounted on the driven shaft 15 up against a spring or snap ring 73. A loading spring 75 extends between the inner race 72 and the interior flange 76 at the inner end of the sleeve 56, the latter being enlarged as at 56a to accommodate the spring 75. The extension 14 of the clutch housing 12, which extension may be either bolted to the clutch housing or formed integral therewith as desired, is provided with a plurality of bores 77 in which springs 78 are disposed and which extend axially inwardly and bear against a shift plate or collar 79 which is in a position to react against the flange 65 to shift the sleeve member 56 to the right, as viewed in Figure 1, against the force of the spring 75 to disengage the clutch members 22 and 25. A pair of oppositely disposed apertured boss sections 80 are formed on the clutch housing extension 14 and receive pins or pull rods 81, the inner ends of which are fastened to the shift collar 79 by a spring ring 82 or the equivalent. The outer ends of the pull rods 81 are bent in the general form of a hook and are adapted to be seated in a recess 85 formed in a yoke 86 that is pivoted, as at 87, on the housing extension 14 and carries an operating lever 88.

In operation, the spring 75 acts against the inner end of the sleeve 56 and reacts against the driven shaft 15 through the inner bearing race 72 and the ring 73 to hold the driving clutch member 25 in firm engagement so as to move with the driven clutch member 22. The clutch may be disengaged by rocking the lever 88 to the left as viewed in Figure 1 to exert a pull on the rods 81, and this in turn will cause the plate 79 to bear against the flange 65 and will move the shiftable clutch member 25 out of engagement with the driven clutch member 22. It will be noted that there is sufficient looseness where the thrust rings 52 and 53 engage the hub or inner section 50 of the driving clutch member 25 to accommodate relative movement between the latter and the sleeve 56 that moves with the driven shaft 15, and it has been mentioned above that by virtue of the resilient disc 30 the shiftable driving clutch member 25 is capable of movement relative to the driving element 10. Thus the driving clutch member is connected for what might be termed floating movement with respect to both the driving element and the driven element so that any misalignment between the driving and driven elements cannot have any effect in causing or tending to cause any relative movement between the clutch members when they are engaged; instead, the clutch members when engaged move as a rigid body at all times, independent of any weaving or distortion between the driving and driven elements due to any misalignment thereof.

It will also be observed that the pressure of the spring 75 is taken against the inner bearing race 72 and ring 73. Hence the end thrust arising by virtue of the spring 75 holding the clutch members in firm engagement is absorbed entirely in the driven shaft 15, no thrust being imposed on either the pilot bushing 17 or the main bearing 71 so long as the clutch is engaged.

The embodiment of the invention shown in Figures 2 and 3 is also a spring-loaded clutch which is normally held engaged by a clutch spring and is released by shifting movement which acts in opposition to the clutch engaging spring.

The clutch spring is indicated at 100 and acts against a driving male cone 101 which has yielding driving connection with the driving flywheel 102 ahead and externally of the cooperating clutch surfaces 103 and 104. The yielding driving connection between the flywheel and the male cone may be secured by driving connections similar to those described in the preceding embodiment of the invention, by driving connections of the type illustrated and described in my copending applications, identified above, or my copending application, Serial No. 731,614, filed June 21, 1934, or by any other suitable and preferred driving connections which will take up the stresses which would otherwise be imposed by misalignment and the like.

In this embodiment of the invention, which is particularly suitable for small units, the driving connections comprise studs 106 which are riveted or otherwise secured at 108 to the flanged portion of the male cone member 101. These studs 106 project into bushings 109 of rubber or other deformable and preferably resilient material and are surrounded and carried by metallic shells 110 pressed into reamed holes in the driving flywheel 102. It is intended that the studs 106 shall slide in the bushings 109 which will preferably be made of an asbestos graphite composition to give the same efficient hardness for the purpose intended. If desired, the bushings may be made of rubber, as in my above identified copending applications, and provided with metallic shells which may be allowed to slide endwise in the reamed holes machined in the rim of the flywheel 102.

The driven female cone 111 to which the friction facing 112 is riveted or otherwise secured at 113 is preferably made of an aluminum stamping riveted at 114 to a hub 115 which is fastened by a key 116 or otherwise rigidly secured to the shaft 117 which constitutes the driven shaft of the clutch device. The key 116 extends outwardly or rearwardly, as at 116a, for a purpose which will appear later. Spring pressure is applied by the spring 100 to the driving male cone 101 through a flanged sleeve 119 which bears against the driving male cone 101 through a thrust washer 120. The pressure of the spring 100 is taken against the main bearing retainer nut 122, and it is obvious that the end thrust from the spring which holds the driving male cone 101 in engagement with the driven female cone 111 is therefore absorbed entirely within the main shaft 117 and does not put any thrust load on either the pilot bearing 123, by means of which the flywheel end of the shaft 117 is piloted in the driving flywheel 102, nor on the main bearing 124, so long as the clutch is engaged.

The main bearing 124 and pilot bearing 123 are thus relieved of end thrust when the clutch is engaged, and the end thrust which is applied to the main bearing when the clutch is disengaged is applied when the parts are stopped, so that there is no running load on this bearing. Relative movement between the flywheel and the driving clutch member due, for example, to misalignment and the like, is absorbed within the bushings 109 or yielding driving connections between the flywheel 102 and the driving male cone 101, as explained in connection with the flexible disc 30 in the construction described above.

The clutch shown in Figures 2 and 3 is disengaged by means of a forked lever 130 which is pivoted at 131 to lugs 132 formed integral with the main bearing housing 134. A thrust collar 135 is pivoted at 136 in the forked end of the lever 130 and carried normally entirely free from the axially shiftable clutch throw-out sleeve 119. When the lower end of the clutch release lever 130 is moved forward from its full line position (Figure 2), the thrust collar 135 cooperates with the flange 138 on the sleeve 119 and compresses the clutch spring 100 thereby relieving the spring pressure on the driving cone member. A split flanged collar 140 is attached to the driving male cone 101 by bolts 141 and loosely engages a groove 142 in the sleeve 119 so that further compression of the spring 100 will withdraw the driving male cone member from contact with the driven female cone member and allow it to rotate freely in the groove 142 with the flywheel while the driven member and main shaft are brought to rest by means of the friction facing washer 143 which is interposed between the thrust collar 135 and the flange 138 on the sleeve 119.

The sleeve member 119 has its inner end flanged, as at 145, and provided with a slot 146 that receives the outer end 116a of the key 116 that fixes the hub 115 of the driven clutch member 111 to the inner end of the driven shaft 117. By virtue of this construction, the sleeve 119 is constrained to rotate with the shaft 117 at all times, and hence no twist can be imparted to the spring 100.

When the clutch is disengaged, the end thrust of the spring 100 is taken through the main bearing 124 which is normally relatively stationary when the clutch is out.

In both embodiments chosen to illustrate the principles of the present invention, the main bearing does not take any end thrust except when the clutch is disengaged. There is a small amount of relative rotation between the driving member and the clutch sleeve whenever the clutch is slipping, this being accommodated by the rotatable connection between the inner end of the sleeve and the inner portion of the driving clutch member, but normally there is no relative movement when the clutch is fully engaged.

Due to the ability of the clutches described above to run with a slight degree of angular misalignment between the crank shaft and the main shaft, it is possible to use a much lighter and less rigid housing for supporting the main bearing and attaching same to the engine. In the embodiment of the invention shown in Figures 2 and 3, the housing 144 is in the form of a bowl-shaped stamping drawn or stamped from flat steel stock. At one end this housing 144, which has an opening 145 (Figure 3) in which the lever 130 operates, has an axial opening 146 in which the main bearing housing 134 is disposed.

The main bearing housing 134 may be a cast metal bearing housing, and is secured to the housing 144 by bolts 147. The opposite end of the housing 144 may, if desired, extend over the flywheel 102, thereby obviating the necessity for a separate flywheel housing and permitting the use of a simple flat plate 148 which may be bolted to or made a part of the engine block. The main bearing and clutch operating mechanism are thereby carried by the cast bearing housing 134 which is mounted in an opening in the drawn steel shell 144 and secured thereto. The resulting combination provides an inexpensive and effective housing for the clutch mechanism, which is quiet and direct in operation, as is the preceding embodiment of the invention.

In both embodiments of the invention the power take-off pulley (not shown) is splined or keyed at 150 directly upon the end of the driven shaft. In Figures 2 and 3, an oil duct 151 is shown as extending through this shaft and closed at its outer end by a lubricant fitting 152. The construction shown in Figure 1 may be provided with the same lubricating arrangement, if desired.

While I have shown and described above the preferred structures in which the principles of the present invention have been illustrated, it is to be understood that, in fact, widely different means may be employed in the practice of the broader aspects of my invention.

What I claim, therefore, and desire to secure by Letters Patent is:

1. A clutch unit adapted to be connected to a driving element, comprising a driven shaft, a driven clutch member fixed to said shaft, a driving clutch member adapted to be engaged with and to move with said driven clutch member, a sleeve connected to shift said driving clutch member, means serving as a key for causing said sleeve to rotate with said driven shaft, and spring means acting between said driven shaft and said sleeve for forcing said driving clutch member into engagement with said driven clutch member.

2. A clutch unit comprising a driven shaft, driving and driven clutch members, the driven clutch member being connected to rotate said driven shaft, a sleeve surrounding said driven shaft and having means serving as an inturned flange at its inner end, said sleeve being keyed to rotate with and to be shiftable axially on said shaft, one of said clutch members being mounted for axial movement and operatively connected to be shifted axially by said sleeve, the internal diameter of the latter being greater than the diameter of said driven shaft, a spring surrounding the latter and disposed within said sleeve, said spring having its inner end bearing against the inturned flange on said sleeve for shifting the latter to bring said clutch members into engagement, and means on the driven shaft for receiving the outer end of said spring.

3. In combination, a driving member, a driven shaft, a driven clutch member fixed against rotation relative to and held against endwise displacement on said shaft, a driving clutch member shiftable into and out of engagement with said driven clutch member and having torque transmitting connection with said driving member at its outer periphery, a flanged sleeve surrounding the shaft and bearing against the driving clutch member through a thrust washer, a housing for the clutch mechanism, a bearing housing carried by said clutch housing, bearing means supporting the driven shaft and disposed in said bearing housing, and a spring normally holding the driving clutch member in engagement with the driven clutch member, said spring surrounding the driven shaft and interposed between the end of said flanged sleeve and said bearing means.

4. In a clutch, in combination, a driving member, a driven shaft, a pair of clutch members, one being connected to said driving member, means including a key connecting the other clutch member to the driven shaft to hold said other clutch member against rotation and endwise displacement on said shaft, a sleeve surrounding the driven shaft and loosely connected to shift said one clutch member axially into and out of engagement with said other clutch member, said sleeve having a notch receiving the rear portion of said key, whereby said sleeve is caused to rotate with said driven shaft at all times, and spring means biased between said shaft and said sleeve for causing the latter to shift said one clutch member relative to said other clutch member.

5. In a clutch, in combination, a driving member, a driven shaft, a driven clutch member fixed against rotation relative to and held against endwise displacement on said shaft, a driving clutch member flexibly connected with said driving member and shiftable into and out of engagement with said driven clutch member, a sleeve disposed about said driven shaft and having a groove at its inner end loosely receiving the inner portion of said driving clutch member and rotatable with respect thereto, spring means surrounding said driven shaft within said sleeve and bearing at its inner end against the latter, and means on said driven shaft adjacent the outer end of said sleeve for receiving the outer end of said spring means.

6. In a clutch, a clutch housing, a driven shaft journalled for rotation in said housing, a driven clutch member fixed to said shaft, a shiftably mounted driving clutch member movable into and out of engagement with said driven clutch member axially of said shaft, a sleeve rotatable with said driven shaft and connected to shift said driving clutch member axially, a member disposed for axial movement in said housing and carried by the portion thereof in which said driven shaft is journaled, and means for operating said axially shiftable member to move the same into and out of engagement with said sleeve for shifting the latter and the driving clutch member connected therewith.

7. In a clutch, a clutch housing, a driven shaft, bearing means journaling said shaft for rotation in said housing, a driven clutch member fixed to said shaft, a shiftably mounted driving clutch member movable into and out of engagement with said driven clutch member axially of said shaft, a sleeve rotatable with said driven shaft and connected to shift said driving clutch member axially, a collar surrounding said sleeve and engageable with a flange formed thereon for shifting the same, and a clutch lever pivoted on the portion of the housing carrying said bearing means for moving said collar into engagement with said flange on the sleeve to shift the latter.

8. Clutch mechanism comprising driving and driven parts, a pair of engageable clutch members, one being fixedly connected to rotate with one of said parts, and means for shifting the other clutch member comprising a sleeve member connected with said other clutch member and having a sliding splined connection with said one part, spring means biased between said one part and said sleeve member for moving said other clutch member in one direction, and means including a collar spring biased for movement out of engagement with said sleeve member and adapted to be moved into engagement with the latter to shift the same against the bias of said spring means.

9. In a cone clutch, a driving member, a driven shaft, an axially shiftable cone clutch member, a flat disc of flexible material connected adjacent its outer periphery to said driving member and connected at its inner perphery to the radially inner portion of said cone clutch member, said flat disc providing for relative movement between said driving and cone clutch members to accommodate angular misalignment and radial and axial displacement of the driving member relative to said driven shaft, and a driven member fixed to said driven shaft and serving as a companion cone clutch element adapted to be engaged with said first clutch element when the latter is shifted axially into contact therewith for driving said shaft from said driving member.

10. In a clutch, a driving member, a clutch housing, a driven shaft journaled for rotation therein, a driven clutch member fixed against rotation relative to and held against endwise displacement on said shaft, a driving clutch member shiftable into and out of engagement with said driven clutch member and connected to rotate with said driving member, a sleeve disposed for axial movement about said shaft and connected at its inner end to said driving clutch member, spring means biased to shift said sleeve in one direction, a collar surrounding said sleeve and connected to shift the same in the other direction, a pair of axially shiftable pins carried by the portion of said housing supporting said driven shaft and connected at their inner ends to said collar, and means carried by said housing and connected with the outer ends of said pins to shift said collar and sleeve in said other direction.

11. In a clutch, a clutch housing, a driven shaft, bearing means supporting said shaft for rotation in said housing, a driven clutch member fixed to said shaft, a shiftably mounted driving clutch member movable into and out of engagement with said driven clutch member axially of said shaft, a sleeve rotatable with said driven shaft and connected to shift said driving clutch axially, said sleeve having a radially inwardly directed flange at its inner end and a radially outwardly directed flange at its outer end, a spring disposed within said sleeve and reacting at its outer end against said shaft and at its inner end against said radially inwardly directed flange, a shift member engageable with the radially outwardly directed flange on said sleeve to shift the latter, and a clutch lever pivoted on the portion of the housing carrying said bearing means for moving said shift member into engagement with said last mentioned flange to shift said sleeve.

12. In a clutch adapted to connect driving and driven parts, an axially shiftable clutch member, a flat disc of flexible material connecting said clutch member with one of said parts and providing for bodily axial and radial movement and angular displacement of the clutch member relative to said one part, and a companion clutch member fixedly connected with the other part and adapted to be engaged by axial movement of said first clutch member.

13. In a clutch, a clutch housing, a driven shaft journaled for rotation in said housing, a driven clutch member fixed to said shaft, a shiftably mounted driving clutch member movable into and out of engagement with said driven clutch member axially of said shaft, a sleeve rotatable with said driven shaft and connected to shift said driving clutch member axially, and an operating lever pivotally mounted on the portion of said clutch housing in which said shaft is journaled and including means engageable with said sleeve for shifting the latter and the driving clutch member connected therewith.

CLARENCE M. EASON.